United States Patent [19]
Yamagishi et al.

[11] 3,821,977
[45] July 2, 1974

[54] RADIAL TIRE HAVING HIGH MODULUS BREAKERS

[75] Inventors: Koichi Yamagishi; Shiro Takahashi, both of Tokyo, Japan

[73] Assignee: Bridgestone Tire Company Limited, Tokyo, Japan

[22] Filed: Jan. 11, 1973

[21] Appl. No.: 322,775

Related U.S. Application Data

[63] Continuation-in-part of Ser. No. 98,830, Dec. 16, 1970, abandoned.

[30] Foreign Application Priority Data
Dec. 24, 1969 Japan.............................. 44-103626

[52] U.S. Cl.............................. 152/361 R, 152/175
[51] Int. Cl................................................. B60c 9/02
[58] Field of Search... 152/361 R, 361 FP, 361 DM, 152/175, 187

[56] References Cited
UNITED STATES PATENTS
2,493,614  1/1950  Bourdon .......................... 152/361 R
3,554,261  1/1971  Mirtain et al. ................. 152/361 FP Primary Examiner—M. Henson Wood, Jr.
Assistant Examiner—George H. Libman
Attorney, Agent, or Firm—Fleit, Gipple & Martin

[57] ABSTRACT

A radial tire having a high cornering power by using a tire breaker consisting of four or six rubberized sheets including cords, the cords of different rubberized sheets being slanted relative to the circumference of the tire at different angles, depending on the initial Young's modulus of each sheet, so as to optimize the lateral rigidity of the breaker for given elastic properties of the breaker materials.

2 Claims, 17 Drawing Figures

INVENTORS
Koichi Yamagishi
Shiro Takahashi

Fleit, Gipple & Jacobson, ATTORNEYS

Lateral rigidity of 4-ply breaker Kg/cm
With X=10.0

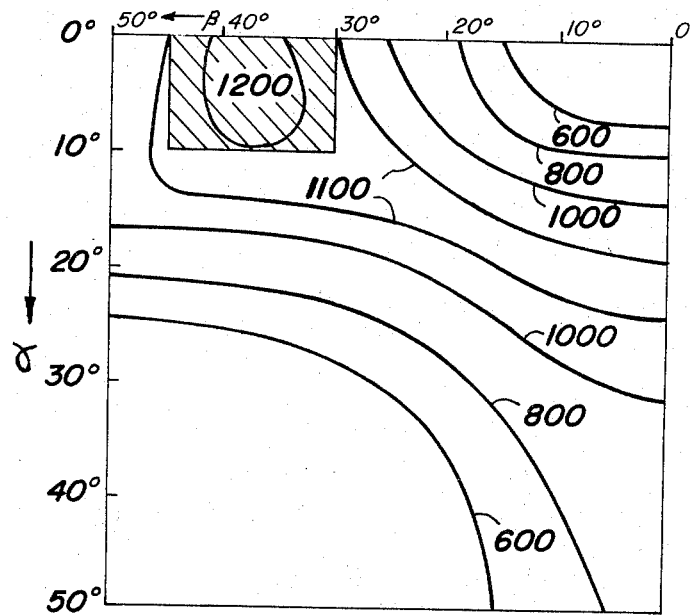
Lateral rigidity of 6-ply breaker, Kg/cm, With X=10.0
FIG_17
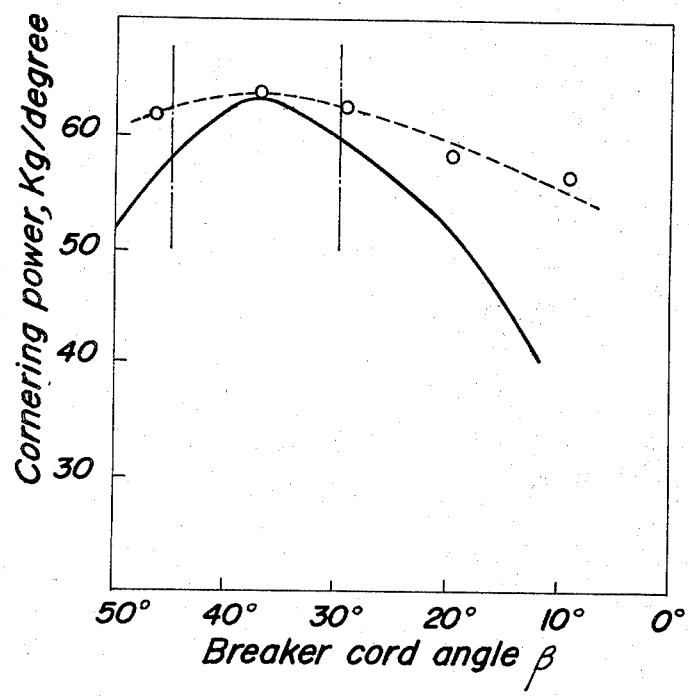

1

RADIAL TIRE HAVING HIGH MODULUS BREAKERS

This application is a continuation-in-part application of original U.S. Patent application Ser. No. 98,830, now abandoned, which was filed on Dec. 16, 1970 while claiming the Convention Priority based on Japenese Patent Application No. 103,626/1959 of Dec. 24, 1969.

This invention relates to a pneumatic tire, and more particularly to a radial tire in which cords of carcass plies are disposed radially, or substantially along radial planes emanating from the axis of rotation of the tire.

In the so-called radial tires, cords of tire carcasses are disposed substantially on planes passing through the axis of rotation of the tire, or on radial planes emanating from the axis of rotation of the tire. Such carcass of the radial tires bears only those loads which are applied thereto along the radial direction of the tire during the running of a vehicle with such radial tires, for instance, by the internal pneumatic pressure of the tire or by impulsive shocks from the outside. Accordingly, it is necessary to provide a suitable reinforcement to supplement the circumferential strength of the radial tire. In fact, a breaker is attached to the circumferential edge surface of the radial tire for such purposes.

The breaker thus disposed acts to tighten the radially disposed carcass cords from the outside toward to the axis of rotation of the tire. Such tightening action of the breaker is generally referred to as the "belting effects".

Conventional radial tires have been designed by using the belting effects as a criterion, and it has been the practice to dispose breaker cords in such a manner that when the tire is inflated by filling air therein under pressure, the breaker cords are aligned with the circumferential direction of the tire or the breaker cords are only slightly slanted relative to the circumferential direction of the tire.

The belting effects alone, however, is not sufficient for providing the optimal performance characteristics of a pneumatic radial tire. The applicants have found that if the breaker cords are circumferentially disposed, or in parallel with the equatorial direction of the tire, some other performance characteristics of the tire become inferior to those of tires having differently disposed breakers. For instance, the applicants's tests indicate that the cornering force of a radial tire, which is one of the most important performance characteristics of pneumatic tires, reaches its maximum value when the breaker cords are slanted relative to the equatorial direction of the tire. More particularly, it was found by tests that the cornering power of a radial tire with breaker cords disposed in parallel with the circumferential direction of the tire is smaller than that of a radial tire with breaker cords slantly disposed by a certain angle relative to the equatorial direction of the tire. Thus, there is a room for improvement in the conventional structure of radial tires.

Radial tires having breakers whose cords are slightly slanted relative to the equatorial direction of the tire are known, but the angle between the breaker cords and the equatorial direction in such known radial tires is selected independently of the physical properties of the material of the breaker cords.

According to the results of tests carried out by the inventors, the optimal design of a tire for meeting given operating conditions (or required performance characteristics) depends on the physical properties of the materials constituting such tire. The applicants have found that, in the case of the breaker of a radial tire, the performance characteristics of the radial tire with such breaker greatly varies depending on the Young's modulus of the material for the breaker cords.

There have been no theoretical analyses and experimental tests on the relation between the elasticity of the breaker cords and the performance characteristics of the radial tire, and the conventional radial tires have been designed without paying due consideration to the elasticity of the breaker cords. In some cases, breaker cords with a very high modulus of elasticity (or rigidity) are disposed in such a manner that the resultant performance characteristics of the tire are not materially improved over those of tires using breaker cords having a low modulus of elasticity (or rigidity).

U.S. Pat. No. 3,643,723, which was assigned to the same assignee as the present application, discloses a breaker made of a plurality of paired plies, but the breaker of this U.S. pat. requires formation of parallelograms with reinforcing cords of different plies. Furthermore, the aforesaid U.S. patent does not provide the maximum lateral rigidity for given elastic properties of breaker materials. In short, the inventors of the aforesaid U.S. patent did not teach any specific formulae for maximizing the lateral rigidity of the breaker for radial tires. The present inventors have succeeded in deriving mathematical formulae for maximizing or optimizing lateral rigidity of the tire breaker, based on the Young's modulus of the breaker cords. As a result, the present invention provides a higher lateral rigidity of tire breaker than that of any conventional tire breakers. With the present invention, the desired high lateral rigidity can be achieved without requiring the formation of the parallelograms with the breaker cords.

Therefore, an object of the present invention is to obviate the aforesaid difficulties of the known radial tires, by providing a novel radial tire having a high anti-abrasive strength and excellent handling characteristics while maintaining satisfactory belting effects. In the radial tire of the present invention, the cord angle of the breaker cords (the angle between the breaker cords and the equator of the tire) is selected as a function of the modulus of elasticity of the breaker cords, so as to maximize the lateral rigidity of the breaker for given physical properties of the breaker material.

For a better understanding of the invention, reference is made to the accompanying drawings, in which.

Figure 14:
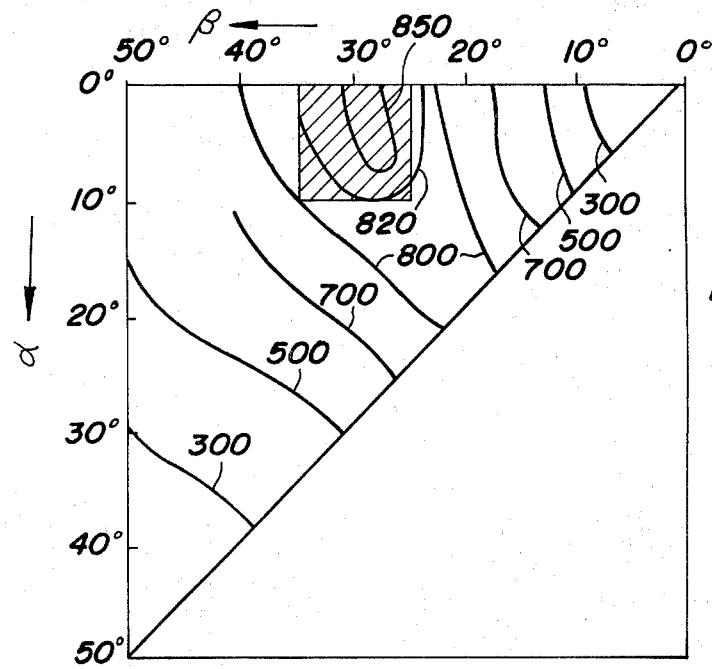
Figure 15:
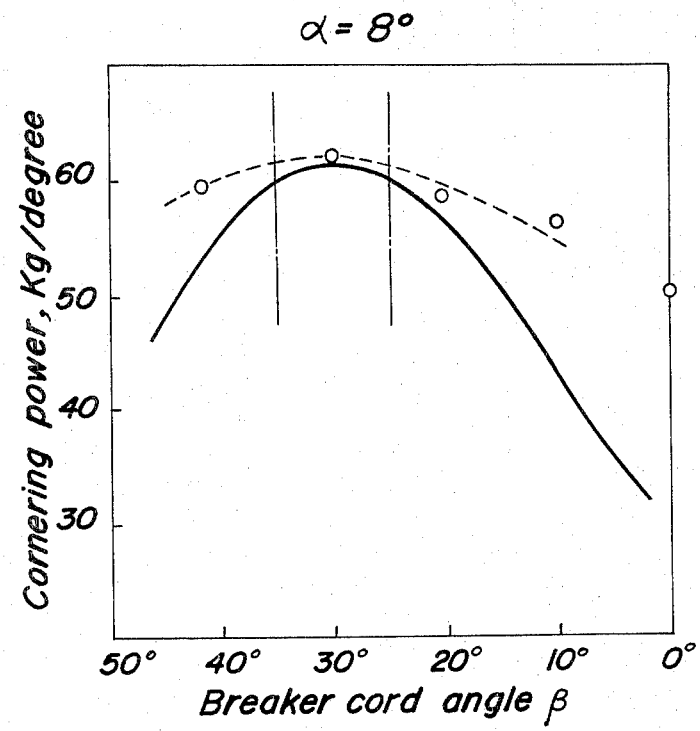

FIGS. 14 and 15 are graphs, illustrating the relations between the cord angles of cords in four-ply breakers and the lateral rigidity of the breakers and between the cord angles and the cornering force of four-ply breakers, respectively; and FIGS. 16 and 17 are graphs, similar to those of FIGS. 14 and 15 except for the fact that the number of plies in each of the breakers is increased from four to six, respectively.

Figure 1:
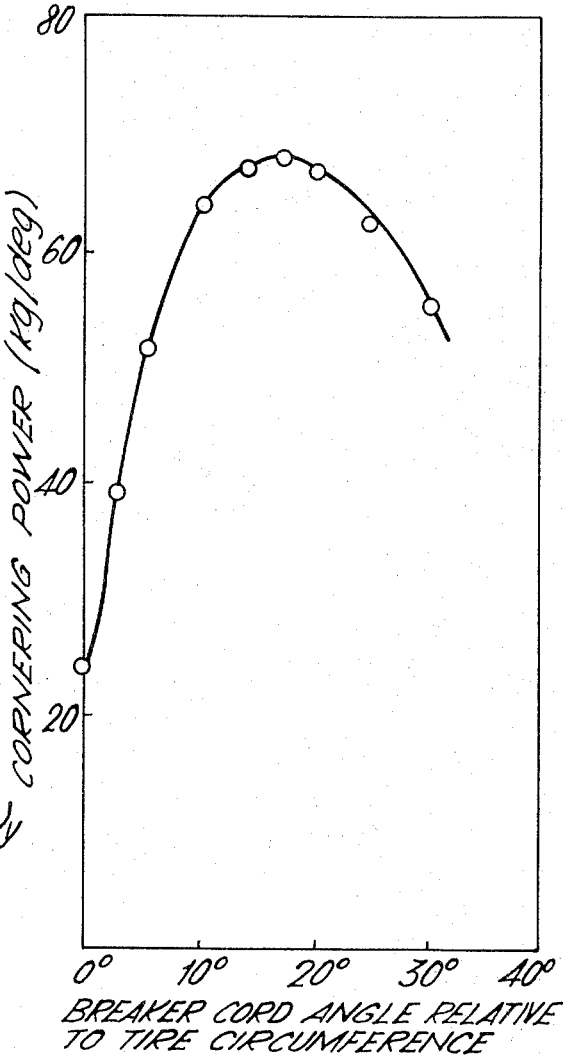
FIG. 1 is a graph, showing the relation between the cornering power of a tire and its breaker cord angle.

Referring to FIG. 1, the cornering power of tire specimens with different breaker cord angles was measured and plotted. What is meant by "cord angle" is the angle between the parallel cords of the breaker and the circumferential direction of the tire. Each of the tire specimens was of 175-14 type, and consisted of a carcass including two-rayon plies and a breaker including two steel-reinforced sheets. It is apparent from the figure that the cornering power of a radial tire varies vastly, depending on the breaker cord angle. In the case of the tire specimens of FIG. 1, the disposition of the breaker cords at zero cord angle, or in parallel with the equator of the tire, results in a minimum cornering power, while the use of the breaker cord angle of slightly less than 20° results in a maximum cornering power which is about three times the cornering power for the zero breaker cord angle.

Thus, one of the important features of the present invention is to maximize the cornering power of radial tire by using a breaker consisting of four or six parallel-cord-reinforced rubber plies or sheets while disposing the rubber sheets at different breaker cord angles, depending on the Young's modulus of individual rubber sheets thus reinforced by the cords.

Fundamentally, there are three basic factors which are required as the basic characteristics of pneumatic tires; namely, freedom from breakage, a high anti-abrasive strength, and good handling characteristics (cornering characteristics). Of the three factors, the problem of tire breakage has been solved to a reasonably acceptable level. Thus, the improvement of the anti-abrasive strength and the handling characteristics of such radial tires, are the two pressing problems to be solved at the present.

In order to improve the anti-abrasive strength of the tire, it is necessary to study the behavior of the tire during the turning of a vehicle with such tires, because of the tire is more abraded or worn during the turning than during the travelling along a straight path. Furthermore, in the actual driving of a vehicle, the chance of travelling along a straight path is rather rare, and the vehicle travels while repeatedly and continuously making different kinds of turns.

As regards the handling characteristics of a tire, its behavior during the turn of a vehicle is of prime importance to the users, although the so-called swaying of the vehicles during its straight travel may present a minor problem from time to time. During each turn, a centrifugal force is applied to the vehicle, and the tires of the vehicle are required to counteract such centrifugal force by generating a cornering force. For better handling characteristics, a higher cornering power is desirable.

It has been found that the anti-abrasive strength of a radial tire increases with the increase of its cornering power. Thus, there is no contradiction between the improvement of the cornering force and the betterment of the anti-abrasive strength of radial tires.

In order to achieve the optimal performance characteristics of a radial tire, inclusive of the anti-abrasive strength and handling characteristics, the deformation of the tire tread during the turning of a vehicle which is supported by such tires must be limited as small as possible. More particularly, in FIG. 2, when a lateral load W is applied to the breaker from the outside, its deformation $W$ should be minimized. For a given lateral load W, the magnitude of the deformation $w$ varies depending on the rigidity, especially lateral rigidity, of the breaker.

The lateral rigidity of the breaker can be improved
1. by applying a high tension to the breaker in the circumferential direction of the tire, and
2. by increasing the shearing rigidity of the breaker for lateral load.

The use of a high internal pneumatic pressure also results in a high lateral rigidity, because the high internal pneumatic pressure causes the circumferential tension T of the breaker to increase. The pneumatic pressure, however, is different from the structure of the tire itself. Accordingly, the applicants have considered only the above two approaches (1) and (2) in the present application, but not the use of the high internal pneumatic pressure of the tire.

For a radial tire with a commonly used breaker cord angle, e.g., 0° to 45°, the "tensile rigidity" and the "lateral rigidity" of the radial tire are inversely related with each other; namely, as one of the tensile rigidity and the lateral rigidity increases, the other one of them decreases.

In the case of a breaker consisting of two parallel-cord-reinforced sheets, it is known that the lateral rigidity of the breaker is maximized when the breaker cords are disposed in symmetry with each other relative to the equator of a tire while assuming a certain cord angle, but as the breaker cord angle deviates from the certain value, either increases or decreases, the lateral rigidity of the breaker becomes smaller.

The applicants have confirmed by test that when the breaker is formed by disposing three, four, or six parallel-cord-reinforced rubberized sheets at the same cord angle or at different cord angles, the lateral rigidity of the breaker can further be improved.

The tests carried out by the applicants also indicated that the breaker cord angle for achieving the maximum lateral rigidity of the breaker varies depending on the modulus of elasticity of such breaker sheets reinforced by the cords. Thus, an object of the present invention is to maximize the lateral rigidity of a tire breaker by making the breaker with four or six parallel-cord-reinforced rubberized plies or sheets, while disposing the reinforcing cords at suitable cord angles, respectively, which angles depend on the Young's moduli of the individual sheets, respectively.

Figure 3:
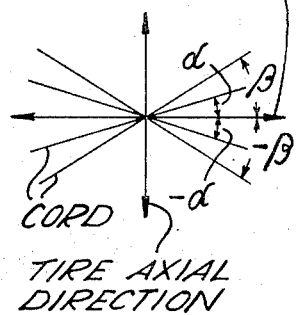
FIG. 3 is a diagrammatic illustration of breaker cords disposed at different cord angles, i.e., at different angles relative to the equator of a tire.

The applicants have derived mathematical formulae for determining the lateral rigidity of a breaker having a plurality of parallel-cord-reinforced rubberized plies or sheets which are disposed at different cord angles, as shown by cord angles $\alpha$ and $\beta$ in FIG. 3. In the derivation, the cord angles $\alpha$ and $\beta$ are treated as independent variables.

Figure 4:
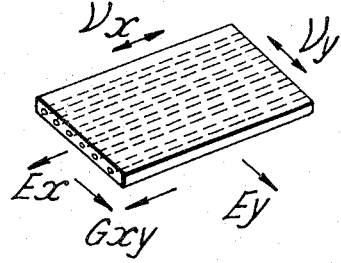
FIG. 4 is a schematic partial perspective view of a cord-reinforced-rubber sheet.

Referring to FIG. 4, the following five factors can be validly defined for a rubberized sheet which is reinforced by disposing cords in parallel with each other so as to extend in one direction only.

$E_x$: Young's modulus of the sheet in the cord direction $E_y$: Young's modulus of the sheet lateral to the cord direction $G_{xy}$: Shearing modulus in the cord direction and in the direction lateral to the cord direction $\nu_x$: Poisson's ratio in the cord direction $\nu_y$: Poisson's ratio lateral to the cord direction The magnitude of the Young's modulus $E_x$ of the rubberized sheet in the cord direction largely depends on the Young's modulus of the reinforcing cord disposed therein; while the Young's modulus lateral to the cord direction $E_y$, the shearing modulus $G_{xy}$, and the Poisson's ratio in the cord direction $\nu_x$ of such rubberized sheet largely depend on the Young's modulus of the rubber.

If a breaker is formed by overlaying two or more of such parallel-cord-reinforced rubberized sheets one on the other while disposing the cords therein at different cord angles $\alpha$ and $\beta$, as shown in FIG. 3, relative to the equatorial direction of a radial tire, the rigidity of the breaker thus formed becomes a function of a number of variables, inclusive of the number of such sheets, cord angles ($\alpha$, $\beta$) of the cords in the different sheets, and the physical properties of the cords and rubbers constituting the different sheets.

Figure 5:
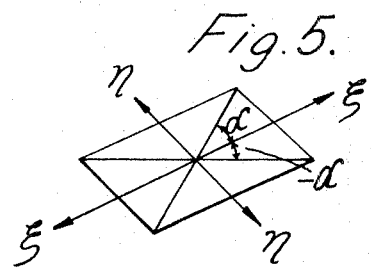
FIG. 5 is a diagrammatic illustration of reference directions, i.e. $\xi$ and $\nu$ directions, to be used in the description of the invention.

Referring to FIG. 5, if the equatorial direction and the lateral or axial direction of the breaker thus formed are represented by suffixes $\xi$ and $\nu$, respectively, the Young's modulus $E_\xi$ in the equatorial direction and the shearing modulus $G_{\xi\eta}$ of the breaker consisting of such parallel-cord-reinforced rubberized sheets can be given as follows.

$$E_\xi = (C_{11}C_{22}C_{33} - C_{11}C_{23}{}^2 + C_{12}C_{13}C_{23} - C_{12}{}^2C_{33} + C_{12}C_{13}C_{23} - C_{13}{}^2C_{22})/(C_{22}C_{33} - C_{23}{}^2) \quad (1)$$

$$G_{\xi\eta} = (C_{12}C_{23}C_{31} - C_{13}{}^2C_{22} + C_{32}C_{21}C_{13} - C_{11}C_{23}{}^2 + C_{11}C_{22}C_{33} - C_{33}C_{12}{}^2)/(C_{11}C_{22} - C_{12}{}^2) \quad (2)$$

Here, $C_{11} = (1/Z) \{ E_y/(1-\nu_x\nu_y) [(n_1+n_2)\cos^4\alpha + (n_3+n_4)\cos^4\beta]$
$+ [2\nu_xE_y/1-\nu_x\nu_y) + 4G_{xy}] (n_1+n_2)\sin^2\alpha\cos^2\alpha + (n_3n_4)\sin^2\beta\cos^2\beta$
$+ E_x/(1-\nu_x\nu_y) (n_1+n_2)\sin^4\alpha + (n_3+n_4)\sin^4\beta \}$ (3)

$C_{22} = (1/Z) \{ E_x/(1-\nu_x\nu_y) (n_1+n_2)\cos^4\alpha + (n_3+n_4)\cos^4\beta$
$+ [2\nu_xE_y/1-\nu_x\nu_y + 4G_{xy}][(n_1+n_2)\sin^2\alpha\cos^2\alpha + (n_3+n_4)\sin^2\beta\cos^2\beta]$
$+ E_y/1-\nu_x\nu_y [(n_1+n_2)\sin^4\alpha + (n_3+n_4)\sin^4\beta] \}$ (4)

$C_{33} = (1/4Z) \{ ((E_x+E_y-2\nu_xE_y)/(1-\nu_x\nu_y)) [(n_1+n_2)\sin^22\alpha + (n_3+n_4)\sin^22\beta]$
$+ 4G_{xy}[(n_1+n_2)\cos^22\alpha + (n_3+n_4)\cos^22\beta] \}$ (5)

$C_{12} = C_{21} = (1/Z) \{ \nu_xE_y/(1-\nu_x\nu_y) [(n_1+n_2)(\cos^4\alpha+\sin^4\alpha) + (n_3+n_4)(\cos^4\beta+\sin^4\beta)]$
$+ [E_x+E_y/1-\nu_x\nu_y - 4G_{xy}][(n_1+n_2)\sin^2\alpha\cos^2\alpha + (n_3+n_4)\sin^2\beta\cos^2\beta] \}$ (6)

$C_{13} = C_{31} = (1/2Z) \{ E_y/(1-\nu_x\nu_y)[n_1-n_2)\cos^2\alpha\sin2\alpha + (n_3-n_4)\cos^2\beta\sin2\beta]$
$- E_x/(1-\nu_x\nu_y) [(n_1-n_2)\sin^2\alpha\sin2\alpha + (n_3-n_4)\sin^2\beta\sin2\beta]$
$+ [\nu_xE_y/(1-\nu_x\nu_y) + 2G_{xy}][(n_1+n_2)\sin2\alpha\cos2\alpha + (-n_3+n_4)\sin2\beta\cos2\beta] \}$ (7)

$C_{23} = C_{32} = 1/2Z \{ E_y/(1-\nu_x\nu_y) [(n_1-n_2)\sin^2\alpha\sin2\alpha + (n_3-n_4)\sin^2\beta\sin2\beta]$
$- E_x/(1-\nu_x\nu_y) [(n_1-n_2)\cos^2\alpha\sin2\alpha + (n_3-n_4)\cos^2\beta\sin2\beta]$
$- [\nu_xE_y/(1-\nu_x\nu_y) + 2G_{xy}][(-n_1+n_2)\sin2\alpha\cos2\alpha + (-n_3+n_4)\sin2\beta\cos2\beta] \}$ (8)

$n_1$, $n_2$, $n_3$, and $n_4$: numbers of the rubberized sheets with the reinforcing cords disposed at angles $+\alpha$, $-\alpha$, $+\beta$, and $-\beta$, respectively;

$Z = n_1 + n_2 + n_3 + n_4$

Figure 2:
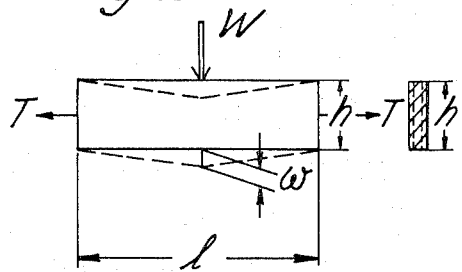
FIG. 2 is a schematic view of a breaker specimen for the measurement of its lateral rigidity.

Referring to FIG. 2, the applicants have simulated the lateral rigidity of the radial tire by a beam under a longitudinal tension T, to which beam a lumped load W is laterally applied at the center thereof while holding the opposing longitudinal edges of the beam stationary. If the deformation, or the strain, at the central portion of the beam, in response to such lumped load W, is represented by $w$, the desired lateral rigidity S can be defined by a ratio $W/W$.

Accordingly, $$S = \frac{1 + \frac{17}{120} \cdot \frac{l^2T}{E_\xi I} - \frac{T^2l^2}{48E_\xi I G_{\xi\eta}bh}}{\frac{l^3}{48E_\xi I} - \frac{l}{8G_{\xi\eta}bh} - \frac{3l^3T}{80E_\xi I G_{\xi\eta}bh}} \quad (9)$$

here, $I = bh^3/12$ $b$: thickness of the breaker $h$: width of the breaker $l$: effective length of the breaker Since the quantities $b$, $h$, and $l$ are constants, the lateral rigidity S of the above equation can be represented by the following function F.

$$S = F(E_x, E_y, G_{xy}, \nu_x, \nu_y, \alpha, \beta) \quad (10)$$

It has been found that the lateral Young's modulus $E_y$ is very small, as compared with the cord direction Young's modulus $E_x$, and the value of the modulus $E_y$ is determined mostly by the kind of the rubber utilized in the sheet. The variation $\Delta E_y$ of the modulus $E_y$, which is caused by the difference of the rubber material, is practically negligible, relative to the Young's modulus in the cord direction $E_x$. Thus, the magnitude of the Young's modulus lateral to the cord direction $E_y$ can be treated as a constant for all practical purposes.

If the inextensibility of the cords is assumed, it has been known that the following relation can be derived.

$$G_{xy} = E_y/4$$

Since the lateral Young's modulus $E_y$ can be assumed to be a constant, the shearing modulus $G_{xy}$ can also be assumed as another constnat. According to the reciprocal theory of Maxwell-Betty, $$\nu_x/E_x = \nu_y/E_y$$

Thus, $$\nu_y = (E_y/E_x) \cdot \nu_x$$

Since the quantity $(E_y/E_x)$ can be assumed to be negligible, the Poisson's ratio lateral to the cord direction $\nu_y$ can also be assumed to be negligible.

As a result, the lateral rigidity S can be simplified into a function of only three independent variables $E_x$, $\alpha$, and $\beta$; namely, $$S = f(E_x, \alpha, \beta) \tag{10a}$$

It is now apparent that, for given Young's moduli in the cord direction $E_x$ of individual rubberized sheets, the conditions for maximizing the lateral rigidity S of the breaker, namely, the values of $\alpha$ and $\beta$ for maximizing S, can be determined from Equations 9 and 10a, while considering all the simplifications derived in the foregoing.

Despite the foregoing simplifications, rigorous analysis of Equation 9, with all the constants and variables substituted therein, is too complicated to carry out by pencil and paper alone. The applicants have conducted a numerical analysis of the nature of Equation 9 by using a digital computer for different breaker structures, more particularly, a breaker with four parallel-cord-reinforced rubberized sheets, and a breaker with six parallel-cord-reinforced rubberized sheets. The results can be summarized as follows.

1. Four-sheet breaker (with cord angles of $\alpha$, $-\alpha$, $\beta$, and $-\beta$, respectively):
   i. For the Young's modulus in the cord direction in range of $0 < E_x \leq 25,000$ Kg/cm².
      The lateral rigidity can be maximized with the following cord angles.
      $\alpha = (-5.0 \times 10^{-4} E_x + 27)° \pm 5°$
      $\beta = (-5.0 \times 10^{-4} E_x + 35)° \pm 5°$
   ii. For the Young's modulus in the cord direction in a range of $25,000$ Kg/cm² $< E_x \leq 80,000$ Kg/cm².
      The lateral rigidity can be maximized with the following cord angles.
      $\alpha = (-1.8 \times 10^{-5} E_x + 19)° \pm 5°$
      $\beta = (1.0 \times 10^{-4} E_x + 20)° \pm 5°$
   iii. For the Young's modulus in the cord direction in a range of greater than $80,000$ Kg/cm².
      The lateral rigidity can be maximized with the following cord angles.
      $\alpha = 5° \pm 5°$, $\beta = 28° \pm 5°$ 2. Six-sheet breaker (two plies each at cord angles of $\alpha$ and $-\alpha$, and one ply each at cord angles $\beta$ and $-\beta$, respectively):
   i. For the Young's modulus in the cord direction in a range of $0 < E_x \leq 40,000$ Kg/cm².
      The lateral rigidity can be maximized with the following cord angles.
      $\alpha = (-2.0 \times 10^{-4} E_x + 26)° \pm 5°$
      $\beta = (-2.0 \times 10^{-4} E_x + 26)° \pm 8°$
   ii. For the Young's modulus in the cord direction in a range of $40,000$ Kg/cm² $< E_x \leq 80,000$ Kg/cm².
      The lateral rigidity can be maximized with the following cord angles.
      $\alpha = (-2.0 \times 10^{-4} E_x + 26)° \pm 5°$
      $\beta = (5.0 \times 10^{-4} E_x - 2)° \pm 8°$
   iii. For the Young's modulus in the cord direction in a range of $80,000$ Kg/cm² $< E_x \leq 100,000$ Kg/cm².
      The lateral rigidity can be maximized with the following cord angles.
      $\alpha = (-2.0 \times 10^{-4} E_x + 26)° \pm 5°$
      $\beta = 38° \pm 8°$
   iv. For the Young's modulus in the cord direction in a range of greater than $100,000$ Kg/cm².
      The lateral rigidity can be maximized with the following cord angles.
      $\alpha = 5° \pm 5°$, $\beta = 38° \pm 8°$ In view of the above results of the analysis by a digital computer, the following general expression has been derived.

$$\alpha(x) = B \cdot f_2(x) + C \cdot f_3(x) \tag{11}$$

$$\beta(x) = B \cdot g_2(x) + C \cdot g_3(x) \tag{12}$$

here,
n: number of plies in a breaker, being four or six
$B = [(6-n)(n-3)/2]$
$C = [(n-4)(n-3)/6]/6$ \hfill (13)

$f_2(x) = 0.27x^2 - 4.73x + 26.5° \pm 5°$ (for $0 < x < 8.0$)
$\quad = 5° \pm 5°$ (for $8.0 \leq x$) \hfill (14)

$g_2(x) = 0.5x^2 - 4.47x + 33° \pm 5°$ (for $0 < x < 8.2$)
$\quad = 30° \pm 5°$ (for $8.2 \leq x$) \hfill (15)

$f_3(x) = -2.0x + 25° \pm 5°$ (for $0 < x < 10.0$)
$\quad = 5° \pm 5°$ (for $x \leq 10.0$) \hfill (16)

$g_3(x) = 0.81x^2 - 5.22x + 28° \pm 8°$ (for $0 < x < 8.0$)
$\quad = 38° \pm 8°$ (for $8.0 \leq x$) \hfill (17)

$$x = E_x/10^4 \text{ Kg/Cm}^2 \tag{18}$$

As the value of the Young's modulus of the rubberized sheet in the cord direction $E_x$, the initial modulus for a strain of 2 to 3 percent can be used.

Figure 6:
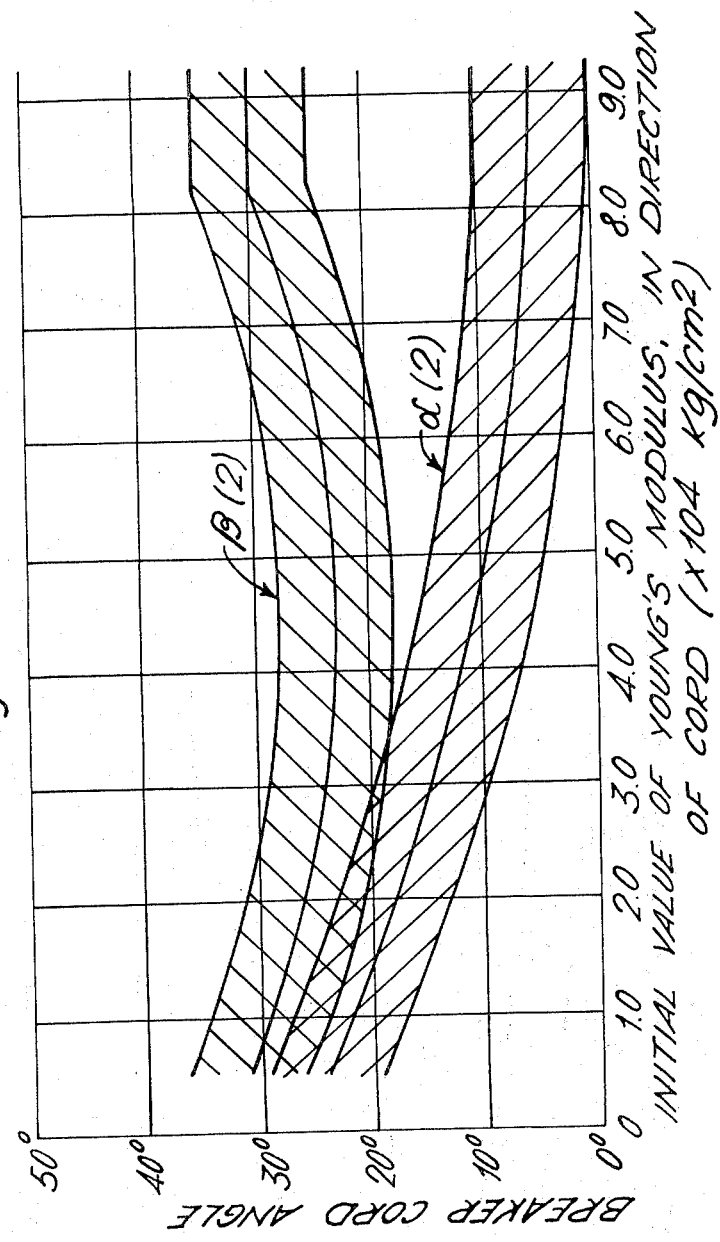
FIGS. 6 and 7 are graphs, illustrating preferable ranges of the breaker cord angles and the Young's modulus of the breaker cords, for breakers consisting of four and six breaker plies, respectively.
Figure 7:
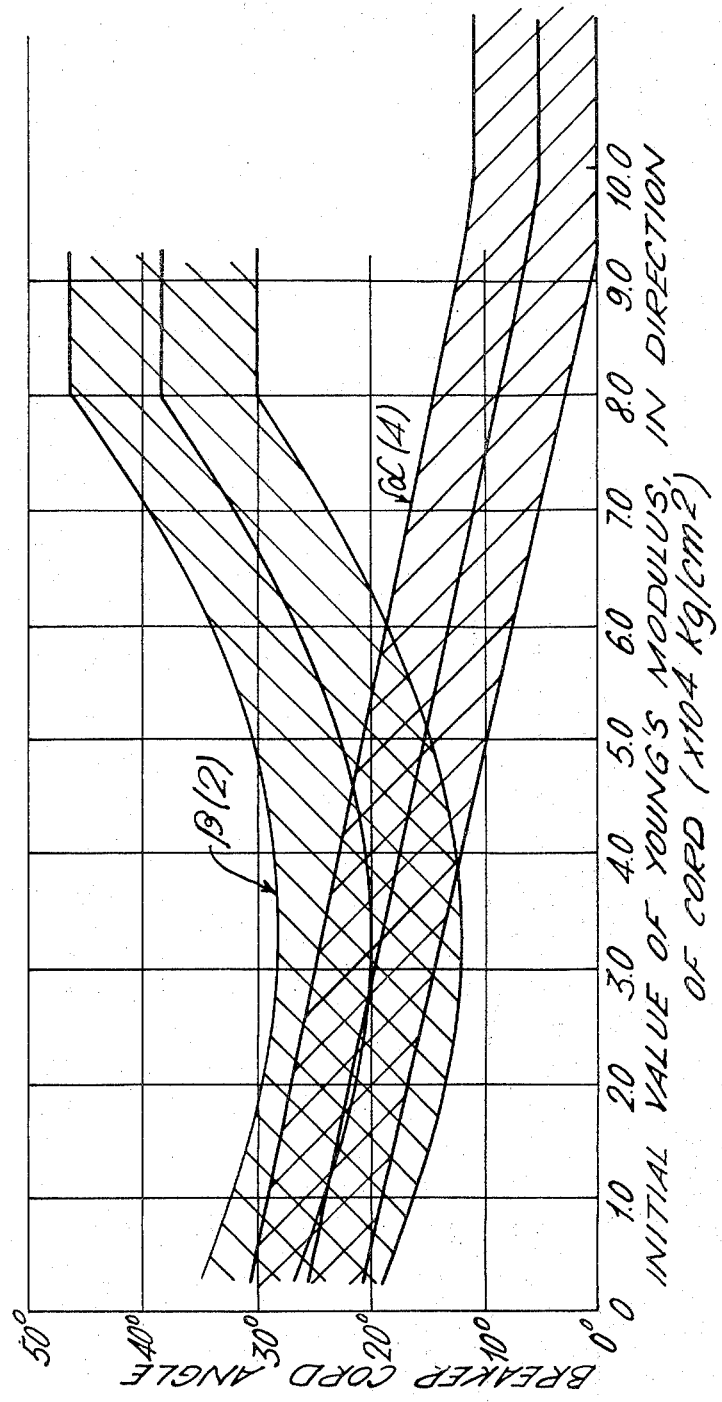
Figure 8:
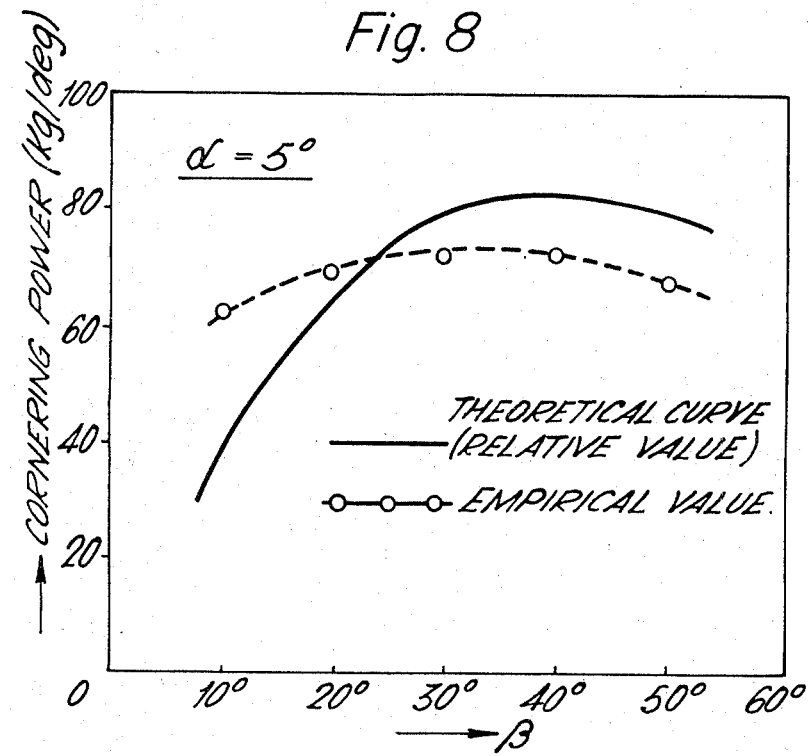
FIGS. 8 to 12 are graphs illustrating the relation between the cornering power of radial tires and their lateral rigidity, for different tire specimens, respectively.
Figure 9:
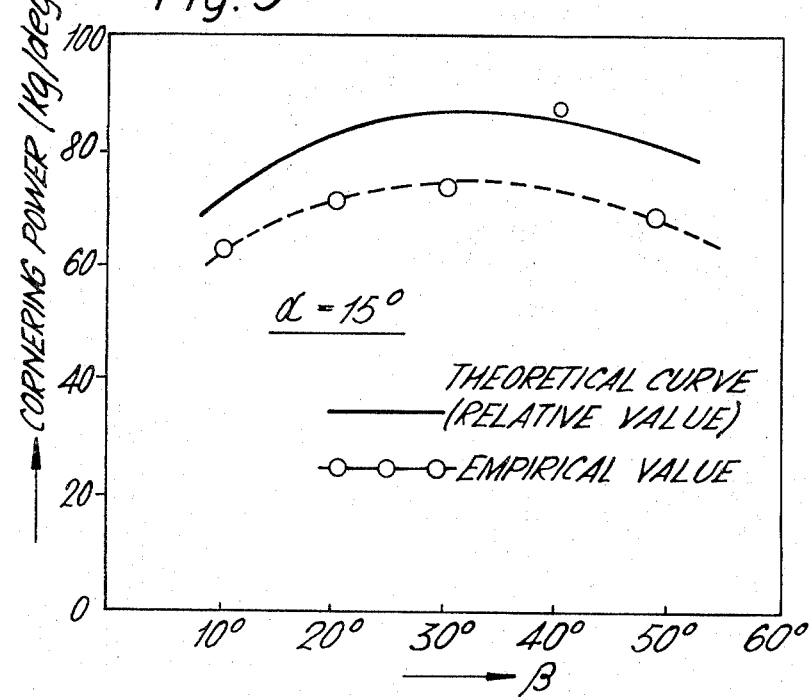
Figure 10:
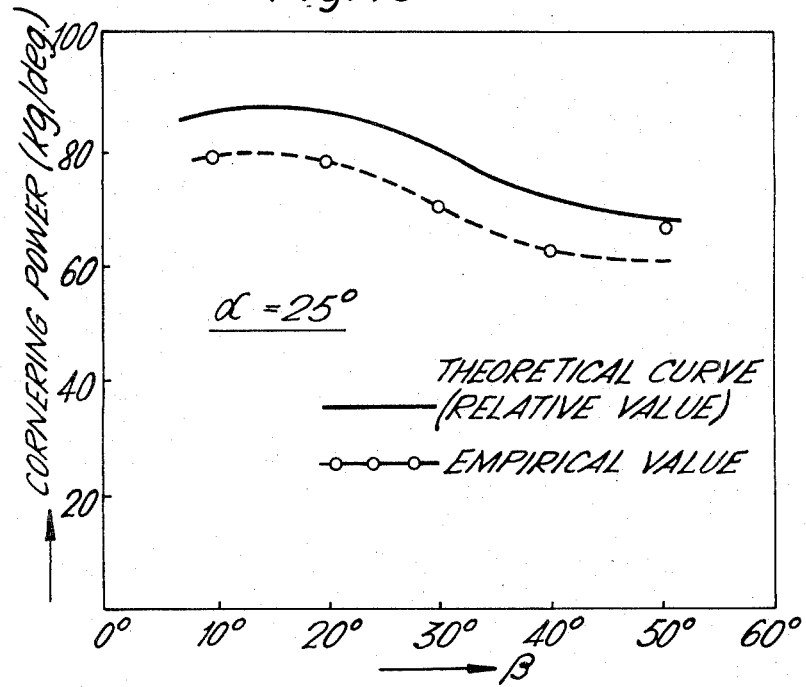
Figure 11:
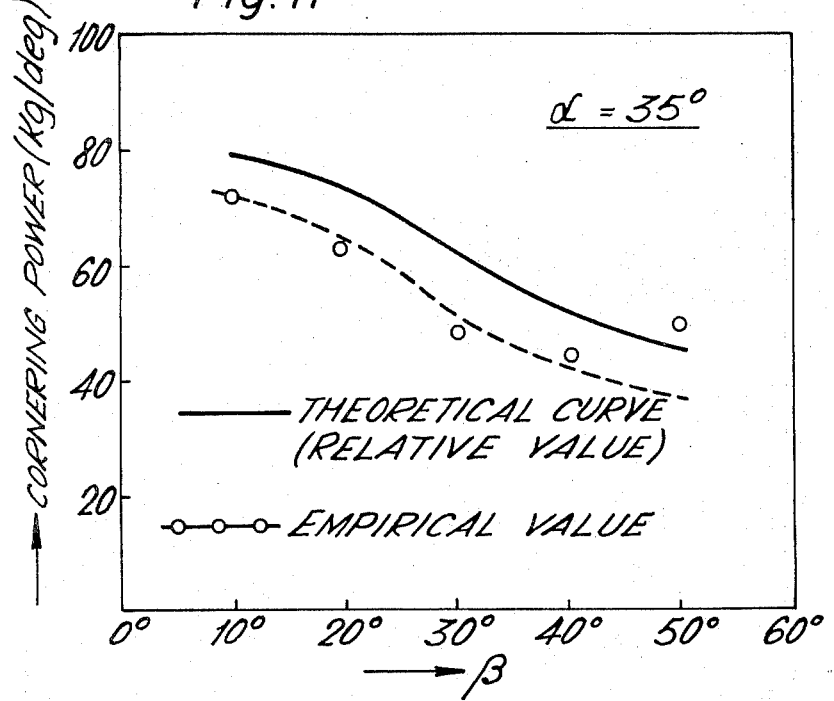
Figure 12:
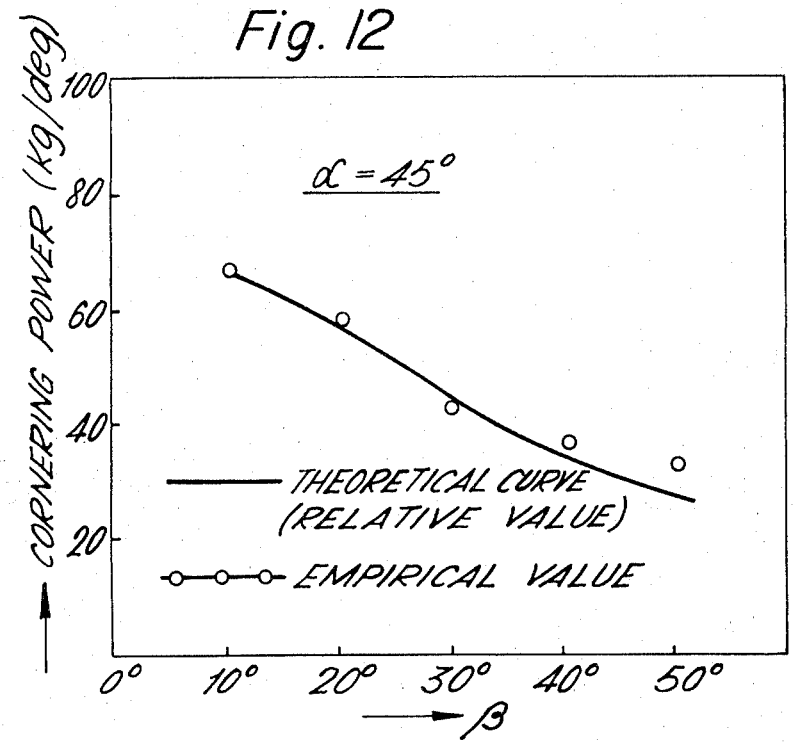

To facilitate the use of such results of the computer analysis by tire designers, the relations of Equations 11 and 12 are graphically shown in FIGS. 6 and 7, in which the abscissa represents the Young's modulus $E_x$, as defined above, while the ordinate represents the cord angle. FIGS. 6 and 7 illustrate such relations for the cases of the four- and six-sheet breakers, respectively. The value of the Young's modulus $E_x$ in the figures represents the initial Young's modulus of each parallel-cord reinforced rubberized sheet, under a limited strain of 2 to 3 percent or less, and the value of the cord angle represents the angle between the parallel disposed breaker cords and the equatorial, or circumferential, direction of the tire.

Figure 13:
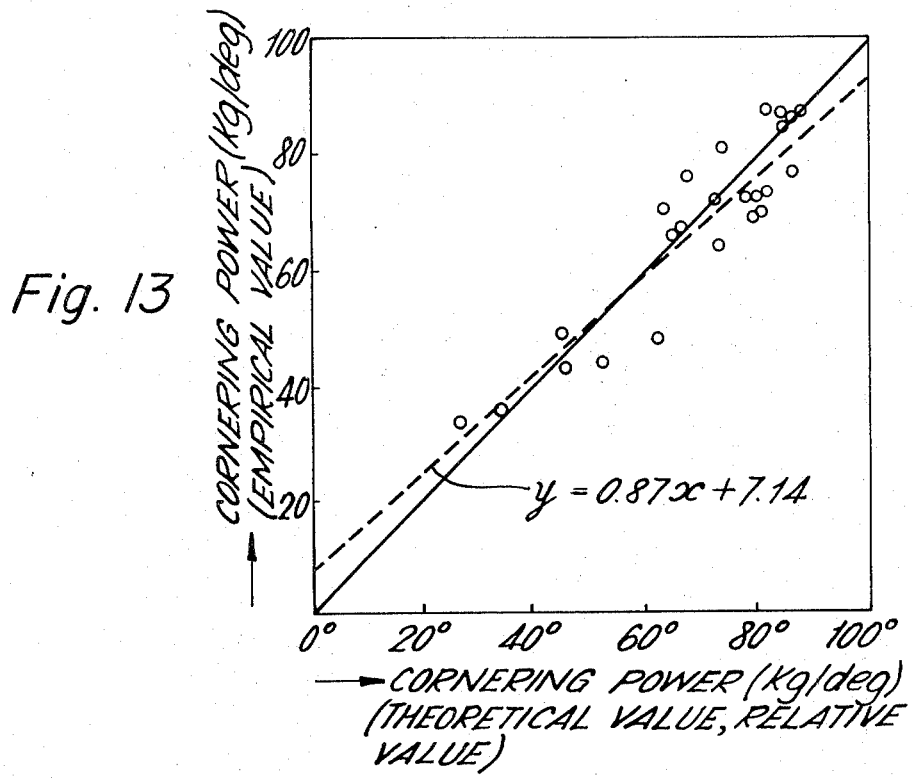
FIG. 13 is a graph, showing the correlation between the theoretical values and the measured values of the cornering power.

A series of tests were carried out by making different tire specimens of the invention for verifying the above computer analysis, and for checking the actual effects of the tire breakers having such Young's moduli and cord angles. FIGS. 8 to 12 show the results of such tests, in comparison with the results of the corresponding computer analysis, and FIG. 13 shows the correlation between the test results and the computer analysis. The tires of the test specimens were of 165 SR 15 type (a kind of passenger car tires), each having a breaker consisting of six rayon-cord-reinforced rubberized sheets and a radial carcass consisting of two rayon-cord-reinforced rubberized plies. Four of the six breaker sheets are disposed in symmetry with each other relative to the equator of the tire, namely two sheets with a cord angle of $+\alpha$ and two sheets with a cord angle of $-\alpha$. The remaining two sheets of the six breaker sheets are disposed in symmetry with each other at cord angles of $+\beta$ and $-\beta$, respectively. Tire specimens for the following 25 different combinations of the breaker sheet cord angles were prepared and tested.

$\alpha = 5°, 15°, 25°, 35°, 45°$
$\beta = 10°, 20°, 30°, 40°, 50°$

The cornering power of each tire specimen thus prepared was measured with a tire inner pneumatic pressure of 2 Kg/cm² and a load of 420 Kg. In order to accurately determine the effects of the different breaker structures, while eliminating the interference by the tire tread, the tread rubber of the test specimens was removed for the above measurement of the cornering power.

As described in the foregoing, the computer analysis was made in terms of the lateral rigidity of the breaker, while the tests were made by measuring the cornering power of the tires with such breakers. Accordingly, the absolute values obtained by the tests were not suitable for direct comparisons with the outcome of the computer analysis. In FIGS. 8 to 13, the values of the rigidity of the breakers obtained by the computer analysis were converted into corresponding cornering powers by applying suitable proportionality constants, respectively, for the sake of the comparison.

It is apparent from FIGS. 8 to 13 that the empirical Equations 11 and 12 are in good agreement with the actual test results for all practical purposes.

FIG. 14 shows the manner in which the lateral rigidity varies as the cord angles $\alpha$ and $\beta$ vary, for the case of four-ply breaker, which are made of cords with a Young's modulus of $10 \times 10^4$ Kg/cm². As apparent from FIG. 14, the lateral rigidity is maximized when the angle $\alpha$ is between 0° and 10° and the angle $\beta$ is between 25° and 35°. As compared with the cord angles disclosed by the aforesaid U.S. Pat. No. 3,643,723, the lateral rigidity of the breaker can be doubled by using the cord angles of the present invention.

Tests were made on the preferably range of the cord angles for the four-ply breaker, by making tires of 165 SR 15 type (a tire size for passenger cars) consisting of a carcass having two rayon cord reinforced rubber sheets and a breaker with four rubberized plies each being reinforced with high Young's modulus organic fibers (aromatic polyamide). The cord angle $\alpha$ was fixed at 8° and the other cord angle $\beta$ was varied in a range of about 0° to 50°. The results are shown in FIG. 15. In the desired range of $\beta = 25°$ to 35°, the theoretical value, as shown by the solid line in FIG. 15, is in good agreement with the test results, as shown by the dotted line in FIG. 15.

Similarly, FIG. 16 shows the manner in which the lateral rigidity varies as the cord angles $\alpha$ and $\beta$ vary, for the case of six-ply breaker, which are made of cords with a Young's modulus of $10 \times 10^4$ Kg/cm². As apparent from FIG. 16, the lateral rigidity is maximized when the angle $\alpha$ is between 0° and 10° and the angle $\beta$ is between 30° and 45°. As compared with the cord angles disclosed by the aforesaid U.S. Pat. No. 3,643,723, the lateral rigidity of the breaker can be double by using the cord angles of the present invention.

Tests were made on the preferable range of the cord angles for the six-ply breaker, by making tires of 165 SR 15 type (a tire size for passenger cars) consisting of a carcass having two rayon cord reinforced rubber sheets and a breaker with six rubberized plies each being reinforced with high Young's modulus organic fibers (aromatic polyamide). The cord angle $\alpha$ was fixed at 8° and the other cord angle $\beta$ was varied in a range of about 0° to 50°. The results are shown in FIG. 17. In the desired range of $\beta = 30°$ to 45°, the theoretical value, as shown by the solid line in FIG. 17, is in good agreement with the test results, as shown by the dotted line in FIG. 17.

As stressed in the foregoing, the Young's modulus of the individual breaker sheet in the cord direction $E_x$ plays an important role in the performance characteristics of the radial tire. Such Young's modulus $E_x$ can be controlled by various measures; for instance, by changing the number of cords in the sheet, by selecting different materials for the cords, e.g., long fiber cords or oriented short fiber cords, by changing the elasticity of the rubber in the breaker sheet through addition of non-oriented short fibers therein, etc.

What is claimed is:

1. In a pneumatic tire having a carcass comprising plies reinforced by substantially radially disposed rubberized cords, a tire breaker comprising four rubberized sheets overlaid one on the other and having a maximum rigidity in a direction parallel to the axis of rotation of the tire for given elastic properties of breaker materials, each sheet including parallel cords embedded therein, the angles between the circumference of the tire and the parallel cords being the following four angles, $+\alpha$, $-\alpha$, $-\beta$, and $-\beta$, depending on the initial Young's modulus $E_x$ of each of said rubberized sheets at a strain of 2 to 3 percent, $E_x$ being not smaller than $8.2 \times 10^4$ Kg/cm², $\alpha$ being greater that 0° but smaller than 10°, and $\beta$ being greater than 25° but smaller than 35°.

2. In a pneumatic tire having a carcass comprising plies reinforced by substantially radially disposed rubberized cords, a tire breaker comprising six rubberized sheets overlaid one on the other and having a maximum rigidity in a direction parallel to the axis of rotation of the tire for given elastic properties of breaker materials, each sheet including parallel cords embedded therein, the angles between the circumference of the tire and the parallel cords being four different angles which are selected from the following angles, $+\alpha$, $-\alpha$, $+\beta$, and $-\beta$, depending on the initial Young's modulus $E_x$ of each of said rubberized sheets at a strain of 2 to 3 percent, $E_x$ being not smaller than $10 \times 10^4$ Kg/cm², $\alpha$ being greater than 0° but smaller than 10°, and $\beta$ being greater than 30° but smaller than 45°.

* * * * *